United States Patent [19]
Hamada et al.

[11] Patent Number: 5,819,120
[45] Date of Patent: Oct. 6, 1998

[54] VARIABLE FOCUS LENS DEVICE IN CAMERA

[75] Inventors: Hisashi Hamada, Asaka; Tsutomu Tanaka, Tokyo; Tokuji Sato; Hiroyuki Iwasaki, both of Asaka, all of Japan

[73] Assignee: Fuji Photo Film Co., Ltd., Kanagawa, Japan

[21] Appl. No.: 758,094

[22] Filed: Nov. 29, 1996

[30] Foreign Application Priority Data

Nov. 28, 1995 [JP] Japan .................................. 7-309247
Nov. 8, 1996 [JP] Japan .................................. 8-296767

[51] Int. Cl.$^6$ .................................................. G03B 17/04
[52] U.S. Cl. ............................................. 396/77; 396/349
[58] Field of Search ................................ 396/76, 77, 78, 396/348, 349

[56] References Cited

U.S. PATENT DOCUMENTS 5,159,364 10/1992 Yanigisawa et al. ...................... 396/76
5,515,129 5/1996 Miyazawa et al. .................. 396/349 X

*Primary Examiner*—W. B. Perkey
*Attorney, Agent, or Firm*—Young & Thompson

[57] ABSTRACT

An initial position of a variable focus lens is set substantially halfway between a wide and a telephotographing end. Thus, just after the initial position is set by turning on a power switch, both the wide photographing and the telephotographing can be performed quickly. The instantaneous change of a moving object can be quickly photographed in a desired visual field. In the present invention, a composition at the initial position which is set by turning on the power switch is not so different from a composition at the wide photographing side or the telephotographing side. Therefore the user is not confused by any composition during photographing.

19 Claims, 7 Drawing Sheets

VARIABLE FOCUS LENS DEVICE IN CAMERA

BACKGROUND OF THE INVENTION

1. Field of the Invention

The present invention relates to a variable focus lens device in a camera. More particularly, the present invention pertains to a variable focus lens device in a camera in which a variable focus lens moves from a retracted position within a camera body to an initial position when a power switch is turned on, and the variable focus lens moves from the initial position in a desired direction by manipulation of a variable switch.

2. Description of the Related Art

Figure 8:
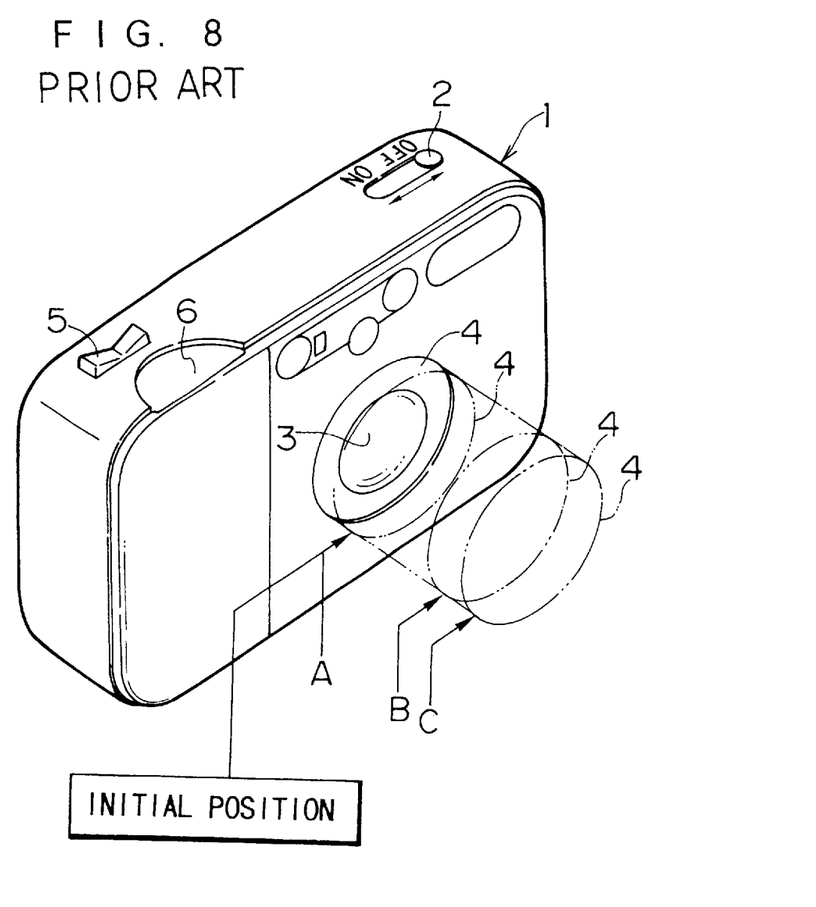
FIG. 8 is a perspective view illustrating a camera to which the conventional variable focus lens device applies.

In the conventional variable focus lens device, as shown in FIG. 8, when a power switch 2 for a camera 1 is turned on, a lens barrel 4 of a variable focus lens 3 moves from a retracted position within a body of the camera 1 to an initial position (a position of a wide end) shown with a chain double-dashed line A.

When a variable switch 5 of the camera 1 is manipulated, the lens barrel 4 extends to a greater focal length and stops at a position of desired focal length, for example, in a proximity to a telephoto end shown with a chain double-dashed line B, or at a position of the telephoto end shown with a chain double-dashed line C. Then, the shutter button 6 is released to obtain the exposure.

When the power switch 2 is turned off in the above-mentioned variable focus lens device, the lens barrel 4 withdraws to the retracted position and is housed in the body of the camera 1.

In the conventional variable focus lens device of the camera, however, the initial position of the variable focus lens 3 is set at the position of the shortest focal length. For this reason, if the object is photographed just after the power switch 2 is turned on, the object cannot be photographed while the variable focus lens 3 is moving to the photographing position. Thus, the instantaneous change of the moving object cannot be quickly photographed.

In the above-mentioned variable focus lens device, if the object is photographed just after the power switch 2 is turned on, the scene surrounding the object in a composition of the wide field at the wide photographing is cut from a composition of a narrow field at the telephotographing. This confuses the user, and a new composition needs to be selected; as a result, the photographing requires a lot of time.

SUMMARY OF THE INVENTION

The present invention has been developed in view of the above-described circumstances. The object of the present invention is to provide a variable focus lens device in a camera, which can photograph an object in a desired visual field just after a power switch is turned on, without confusing a user during photographing.

In order to achieve the above-mentioned object, the present invention comprises: a power switch for the camera; a variable focus lens provided in such a manner as to be movable in a range between a retracted position within a camera body and a telephoto end position of the variable focus lens; a driving means for moving the variable focus lens in the range; and a control means for controlling the driving means to move the variable focus lens when the power switch is turned on, so as to position the variable focus lens at an initial position substantially halfway between a wide end of the variable focus lens and the telephoto end.

According to the present invention, the initial position of the variable focus lens is substantially halfway between the wide end and the telephoto end of the variable focus lens. Thereby, just after the variable focus lens is set to the initial position when the power switch is turned on, either wide angle or telephoto composition can be quickly performed. Thus, in the present invention, the instantaneous change of a moving object, etc. can be quickly photographed in a desired visual field.

Moreover, according to the present invention, composition at the initial position differs less from either wide angle or telephoto compositions than before. Therefore, the user is not confused by any composition during photographing.

In the invention, a timer means is provided, which upon elaspe of a predetermined time after an exposure, causes the control means to drive the driving means to move the variable focus lens to the initial position. Thereby, in the present invention, for the next exposure, the instantaneous change of the moving object, etc. can be quickly photographed in a desired visual field. Furthermore, the user is not confused during photographing.

In another embodiment of the invention, the initial position corresponds to a standard angle of view. If the standard angle of view is 46°, which angle is substantially equal to an angle of a person's visual field, the object can be viewed through the camera in a size substantially equal to the object being viewed directly. Thus, the user is not confused during photographing.

The focal length of the variable focus lens at the initial position corresponding to the standard angle of view varies according to the frame size of the film. For example, if the standard angle of view is 46° in the variable focus lens device in the camera using 35 mm film, the focal length of the variable focus lens at the initial position is approximately 50 mm. In the variable focus lens device in the camera using film whose frame is 17 mm long and 30 mm wide, the focal length of the variable focus lens at the initial position is approximately 40 mm. Furthermore, in the variable focus lens device in the camera using film whose frame is 60 mm long and 45 mm wide, the focal length of the variable focus lens at the initial position is approximately 75 mm.

In another embodiment the invention, the initial position corresponds to the focal length which is frequently used by the user (the user's composition ). The variable focus lens device is provided with a storing means, a determination means, a driving means for the variable focus lens, and a control means. The storing means contains data on the focal length of every exposure, and the determination means determines the user's composition tendency according to the focal length data. Then, the control means controls the driving means according to the determination, so that the initial position can be set at a position corresponding to the user's composition tendency. That is, the control means controls the driving means so that if the user's tendency determined by the determination means is to wide angle, the variable focus lens can be moved to the wide angle end, and if the user tends toward telephoto shots, the variable focus lens can be moved to the telephoto end, and if the user typically chooses the standard focal length, the variable focus lens can be moved to the standard position. The initial position corresponds to a focal length the user prefers most, so that the object can be photographed in a preferable focal length just after the power switch for the camera is turned on.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
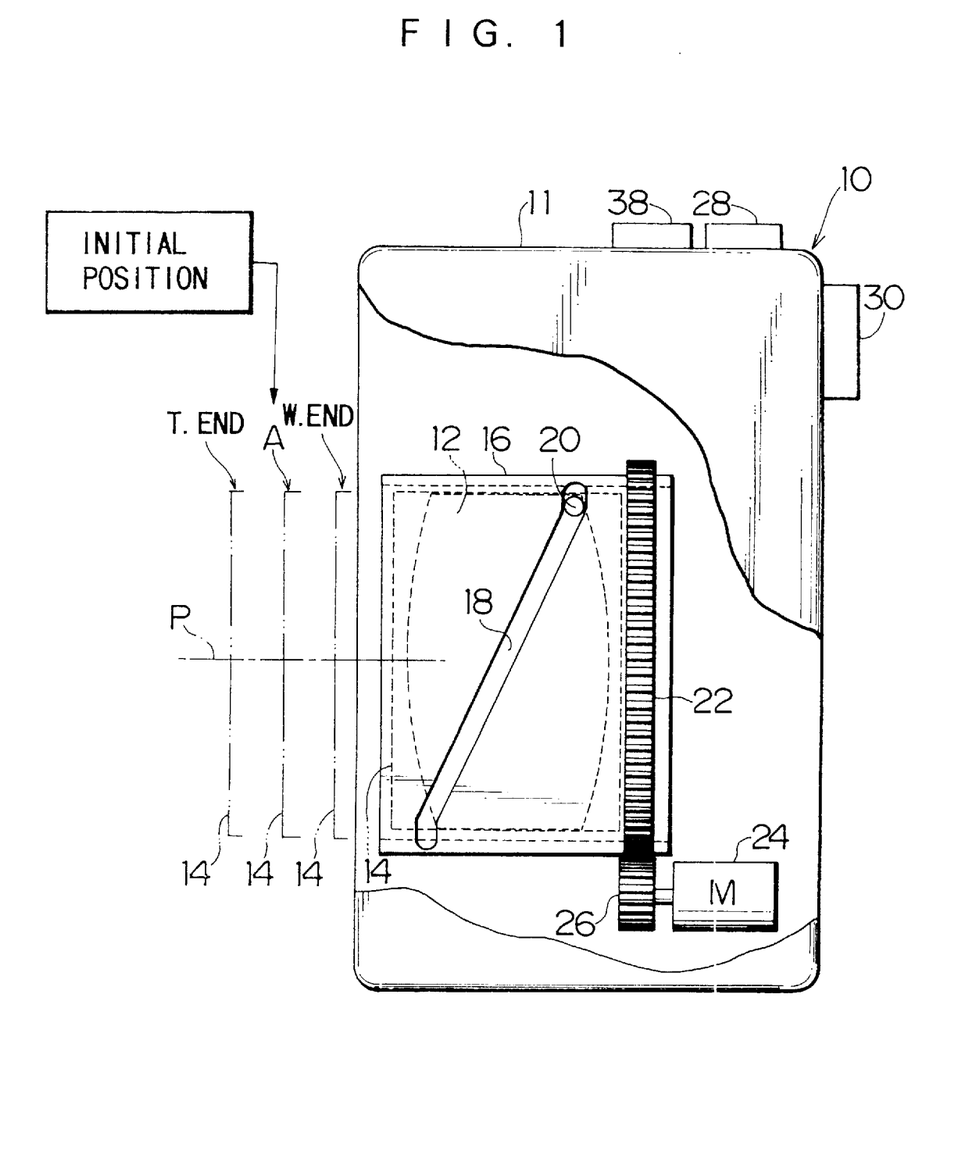
FIG. 1 is a side view illustrating the structure of a camera incorparating a variable focus lens device of to the present invention.

FIG. 1 is a side view illustrating the structure of a camera 10 using 35 mm film, which a variable focus lens device in a camera according to the present invention applies to. In the camera 10, a variable focus lens 12 shown with a dashed line is held by a lens barrel 14 shown with a dashed line. The lens barrel 14 is arranged in a cam cylinder 16 shown with a solid line in FIG. 1 in such a manner as to be movable in a direction parallel to an optical axis P. The lens barrel 14 is engaged with a cam groove 18, which is formed in the cam cylinder 16, via an engagement pin 20. A projection (not shown), which projects from the outer periphery of the lens barrel 14, is engaged with a groove (not shown), which is formed at the inner periphery of the cam cylinder 16, being parallel to the optical axis P. The lens barrel 14 connects to the cam cylinder 16 via the projection and the groove.

A gear 22 is provided at the outer periphery of the back end of the cam cylinder 16. The gear 22 is engaged with a gear 26 of a variable motor (driving means) 24. Thus, if the cam cylinder 16 has been rotated around the optical axis P by the variable motor 24, the lens barrel 14 is moved forward and backward in the direction parallel to the optical axis P by the engagement pin 20 moving along the cam groove 18, and the projection and groove keep the lens barrel 14 aligned. A position of the W. end of the lens barrel 14 as shown with a chain double-dashed line in the drawing corresponds to a position of the wide end of the variable focus lens 12, and a position of the T. end of the lens barrel 14 as shown with a chain double-dashed line in the drawing corresponds to a position of the telephoto end of the variable focus lens 12.

While a power switch 28 for the camera 10 is off, the lens barrel 14 is retracted within a camera body 11. When the power switch 28 is turned on, the lens barrel 14 is brought to an initial position indicated by A in the drawing. The initial position A is set substantially halfway between the wide angle end and the telephoto end. The lens barrel 14 is moved toward the wide end or the telephotographing end step by step in series.

Figure 2:
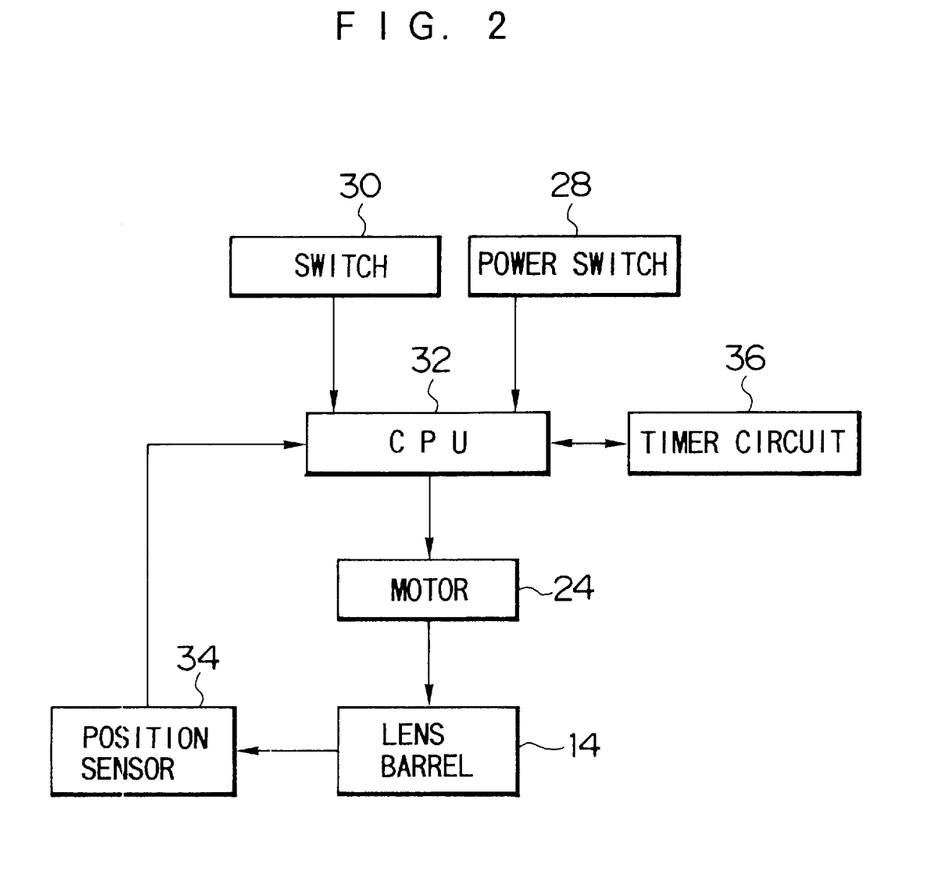
FIG. 2 is a block diagram illustrating a control system in the variable focus lens device of the camera according to the first embodiment of the present invention.

FIG. 2 is a block diagram illustrating a control system of the variable focus lens 12. A central processing unit (CPU) (control means) 32 is built in the camera 10 to unify and control the camera 10. The CPU 32 controls the variable motor 24 according to signals from the power switch 28 and the variable switch 30. The lens barrel 14 is moved by the driving force of the variable motor 24, and the position to which the lens barrel 14 moves is always detected by a position sensor 34 which is built into the camera body 11. The position sensor 34 outputs a signal indicating a position to which the lens barrel 14 moves. Receiving a predetermined position signal from the position sensor 34, the CPU 32 stops the variable motor 24. Thereby, the variable focus lens 12 is positioned at a position for photographing at a desired width of field.

A timer circuit 36 is provided in the control system. If the CPU 32 receives no signal, a timer start signal is sent from the CPU 32 to the timer circuit 36. Receiving the signal from the CPU 32, the timer circuit 26 starts counting elasped time. Then, if the CPU 32 receives no signal for a predetermined time (thirty seconds for example), the timer circuit 36 sends a signal to the CPU 32. Receiving the signal from the timer circuit 36, the CPU 32 controls the variable motor 24 to move the variable focus lens 12 to the initial position A shown in FIG. 1.

According to the variable focus lens device which is constructed in the above-mentioned manner, if receiving an operational signal from the power switch 28 when the power switch 28 is turned on, the CPU 32 controls the variable motor 24 so as to move the lens barrel 14 to the initial position A shown in FIG. 1. Moreover, if receiving an operational signal from the variable switch 30, the CPU 32 controls the variable motor 24 according to the signal so that the lens barrel 14 can be moved in the direction of the wide angle or telephoto end to be positioned at a position for photographing at a desired width of field. In the camera 10, if the shutter button 38 is pressed, the automatic exposure photographing is taken.

As stated above, according to this embodiment, the initial position A of the variable focus lens 12 is set halfway between the wide angle end and the telephoto end of the variable focus lens 12. Thus, just after the variable focus lens 12 is set to the initial position when the power switch 28 is turned on, both the wide angle and telephoto exposure can be quickly taken.

Thus, in this embodiment, the instantaneous change of a moving object, etc. can be quickly photographed in a desired wide visual field or telephoto visual field. Moreover, the composition at initial position and the composition at the wide or telephoto end are nearer than before. Thus, any composition setting does not confuse the user.

Figure 3:
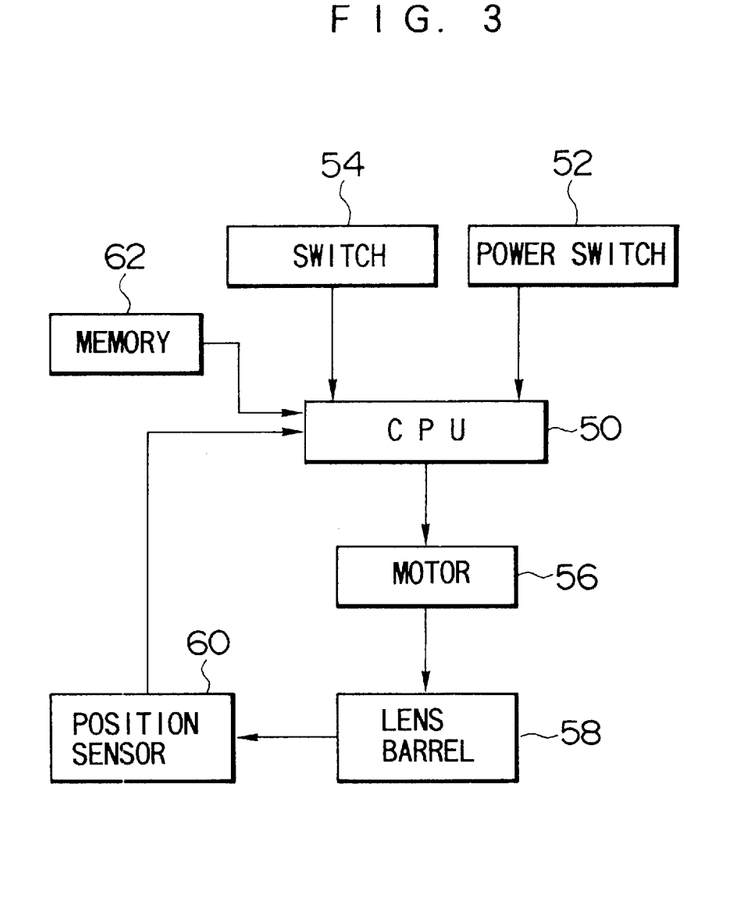
FIG. 3 is a block diagram illustrating a control system in the variable focus lens device of the camera according to the second embodiment of the present invention.

FIG. 3 is a block diagram illustrating the steps of controlling the variable focus lens device in the second embodiment of the present invention.

A CPU (control means) 50 of the variable focus lens device controls a variable motor (driving means) 56 according to signals from a power switch 52 and a variable switch 54. The driving force of the variable motor 56 moves a lens barrel 58. A position to which the lens barrel 58 moves is always detected by a position sensor 60 built in the camera body. The position sensor 60 outputs a signal indicating a position which the lens barrel 58 moves to. Receiving a predetermined position signal from the position sensor 60, the CPU 50 stops the variable motor 56. Thereby, variable focus lens held by the lens barrel 58 is positioned at a position for photographing in a desired visual field.

The CPU 50 is provided with a non-volatile memory (EEPROM for example) 62. The memory 62 contains data which is used for setting, when the power switch 52 is turned on, the variable focus lens at an initial position at which the focal length of the variable focus lens corresponds to a standard angle of view.

The standard angle of view is an angle of view at which an object can be viewed in a size substantially equal to the object being viewed directly. That is, the standard angle of view is substantially equal to an angle of a person's visual field. The standard angle of view is 46° in this embodiment; however, the angle is not restricted to this.

The focal length corresponding to the standard angle of view (46°) varies according to the frame size of the camera. For example, in the variable focus lens device of the camera using the 35 mm film, the focal length of the variable focus lens at the initial position is 50 mm. Moreover, in the variable focus lens device of the camera using the advanced photographic system (Aps) film whose frame is about 17 mm long and about 30 mm wide, the focal length of the variable focus lens at the initial position is 40 mm. Furthermore, in the variable focus lens device of the camera using medium format film whose frame is 60 mm long and 45 mm wide, the focal length of the variable focus lens at the initial position is 75 mm.

Thus, data indicating 50 mm is stored in the memory 62 in advance in the camera using the 35 mm film; data indicating 40 mm is stored in the memory 62 in advance in the camera using Aps film; and data indicating 75 mm is stored in the memory 62 in advance in the camera using medium format film. The data stored in the memory 62 is read by the CPU 50 when the power switch 52 is turned on. Then, the CPU 50 controls the variable motor 56 to move the lens barrel 58 so that the focal length of the variable focus lens is the focal length indicated by the data.

Next, an explanation will be given about the operation of the variable focus lens device which is constructed in the above-mentioned manner.

In the camera using the 35 mm film, when the power switch 52 is turned on, the CPU 50 reads the data indicating the focal length of 50 mm in the memory 62. Then, the CPU 50 controls the variable motor 56 so as to position the lens barrel 58 at a position corresponding to the focal length of 50 mm.

Moreover, in the camera using Aps film, when the power switch 52 is turned on, the CPU 50 reads the data indicating the focal length of 40 mm in the memory 62. Then, the CPU 50 controls the variable motor 56 so as to position the lens barrel 58 at a position corresponding to the focal length of 40 mm.

Furthermore, in the camera using medium format film, when the power switch 52 is turned on, the CPU 50 reads the data indicating the focal length of 75 mm in the memory 62. Then, the CPU 50 controls the variable motor 56 so as to position the lens barrel 58 at a position corresponding to the focal length of 75 mm.

As stated above, in this embodiment, the initial position is set at the position where the angle of view is the standard angle of view; thus, the object can be viewed via the camera in a size substantially equal to the object being viewed directly. Thereby, the user is not confused during photographing.

The frame size of the camera is not restricted to the previously-mentioned three sizes, and the initial position is set at a position according to an optional frame size.

In this embodiment, a timer circuit may be provided in the control system as described in the first embodiment. In this case, if the CPU 50 receives no signal for a predetermined time (thirty seconds for example), the timer circuit outputs a signal to the CPU 50. Receiving the signal from the timer circuit, the CPU 50 controls the variable motor 56 to move the variable focus lens to the initial position.

Figure 4:
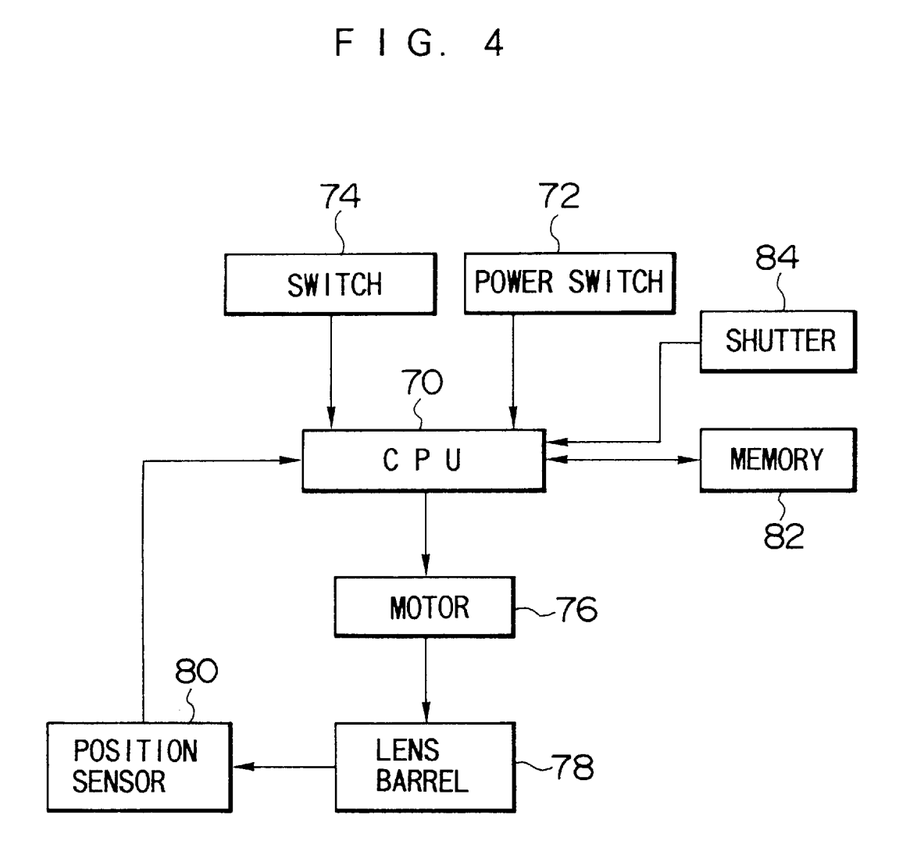
FIG. 4 is a block diagram illustrating a control system in the variable focus lens device of the camera according to the third embodiment of the present invention.

FIG. 4 is a block diagram illustrating the control system of the variable focus lens device in the third embodiment of the present invention.

A CPU (determination means and control means) 70 controls a variable motor (driving means) 76 according to signals from a power switch 72 and a variable switch 74. The driving force of the variable motor 76 moves a lens barrel 78, and then a position to which the lens barrel 78 moves is always detected by a position sensor 80 built in the camera. The CPU 70 receives a signal indicating the position which the lens barrel 78 moves to. Receiving a predetermined position signal from the position sensor 80, the CPU 70 stops the variable motor 76. Thereby, the variable focus lens held by the lens barrel 78 is positioned at a position with a desired visual field.

The control system is provided with a non-volatile memory (storing means) (EEPROM for example) 82. Every time the shutter 84 is released, the data on the focal length of the variable focus lens at the time of exposure is stored in the memory 82. The memory 82 is able to store the data on the focal length for one hundred shots. Every time the shutter 84 is released after the hundredth shot, the CPU 70 erases the data on the focal length for the oldest shot stored in the memory 82 to update the data points on the focal length.

The CPU 70 makes a histogram representing the number of shots for each class of the focal length by means of the one hundred data points on the focal length, which are stored as described above. Then, the CPU 70 determines an initial position of the lens barrel 78 by the histogram and controls the variable motor 76 so as to position the lens barrel 78 at the initial position when the power switch 72 is turned on again.

Next, an explanation will be given about the operation of the variable focus lens device which is constructed in the above-mentioned manner.

Figure 5:
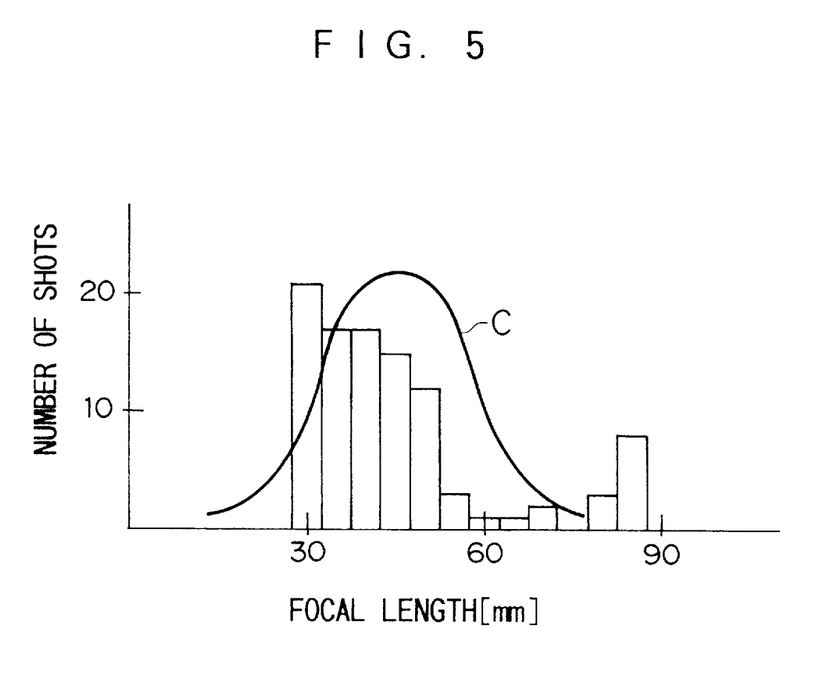
FIG. 5 is a histogram and a normal curve representing focal length positions shifted toward wide angle exposures.

FIG. 5 is a histogram of the data on the focal length, which are stored in the memory 82. In FIG. 5, the curve C is a normal distribution curve constructed based on the histogram. The focal length point of the maximum at the normal distribution curve C is designated as an initial focal length which the initial position of the lens barrel 78 corresponds to.

As shown in the histogram of FIG. 5, the user of the camera tends to take pictures at the wide angle segment from 30 mm to 50 mm, and the focal length at the maximum of the normal curve C is 45 mm. In this case, when the power switch 72 is turned on, the CPU 70 detects the focal length of 45 mm at the maximum of the normal distribution curve C. Then, the CPU 70 controls the variable motor 76 so as to position the lens barrel 78 at a position corresponding to the focal length of 45 mm.

Figure 6:
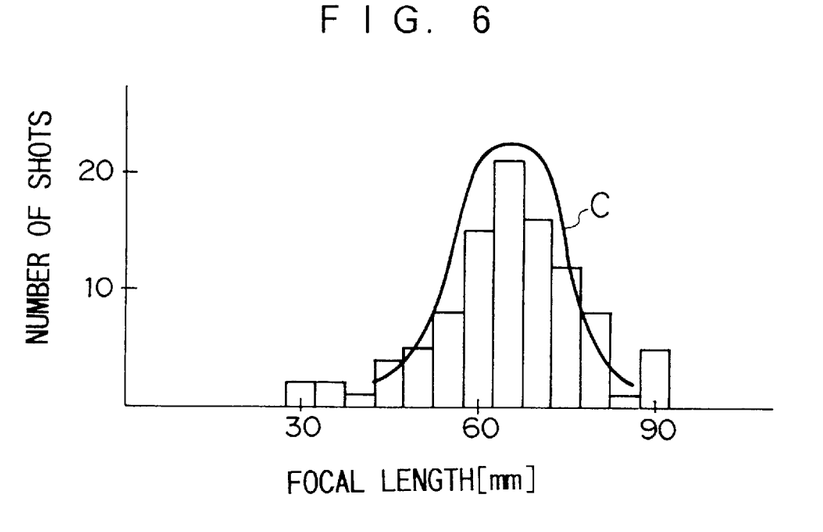
FIG. 6 is a histogram and a normal curve wherein focal length positions at the shooting are distributed for standard photography.

FIG. 6 is a histogram and a normal distribution curve of the data on the focal length, which are stored in the memory 82 of another camera. As shown in the histogram, the user of this camera tends to take pictures at the standard focal length in a range from 55 mm to 75 mm, and the focal length at the maximum of the normal distribution curve C is 65 mm. In this case, when the power switch 72 is turned on, the CPU 70 detects the focal length of 65 mm at the maximum of the normal distribution curve C. Then, the CPU 70 controls the variable motor 76 so as to position the lens barrel 78 at a position corresponding to the focal length of 65 mm.

Figure 7:
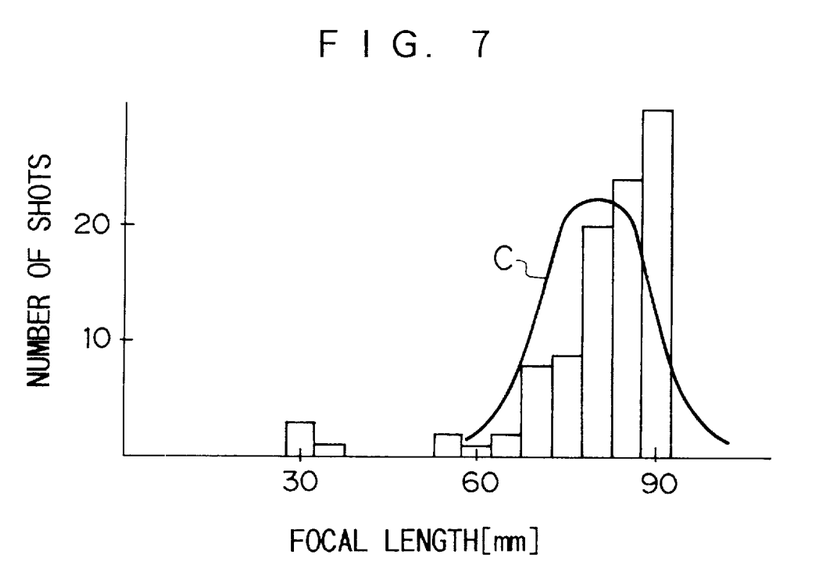
FIG. 7 is a histogram and a normal curve wherein focal length positions are shifted towards the telephoto end.

FIG. 7 is a histogram and a normal curve of the data on the focal length, which are stored in the memory 82 of another camera. As shown in the histogram, the user of this camera tends to take pictures in the telephoto range from 70 mm to 90 mm, and the focal length at the maximum of the normal distribution curve C is 80 mm. In this case, when the power switch 72 is turned on, the CPU 70 detects the focal length of 80 mm at the maximum of the normal distribution curve C. Then, the CPU 70 controls the variable motor 76 so as to position the lens barrel 78 at a position corresponding to the focal length of 80 mm.

As stated above, according to the present invention, the focal length which is frequently used by the user during photographing is designated as the initial focal length which the initial position of the lens barrel 78 corresponds to. Thereby, immediately after turning on the power switch of the camera, the user can take a picture at the focal length according to the user's tendency.

In this embodiment, the frequently-used focal length is determined based on the statistical analysis by means of the normal distribution curve; however, another statistical analysis may be performed to determine the frequently-used focal length.

Moreover, in this embodiment, the focal length at the maximum of the normal distribution curve is designated as the initial focal length; however, the present invention is not restricted to this. If the user tends to take pictures at wide angle settings, the variable focus lens may be moved to the wide angle end. If the user tends to take pictures at the telephoto end, the variable focus lens may be moved to the telephoto end. If the user tends to take pictures at the standard focal length, the variable focus lens may be moved to the standard position.

Further, in this embodiment, the variable focus lens device determines the user's tendency according to the one hundred data points on the focal length. The number of data points is not restricted to this.

Moreover, in this embodiment, although the variable focus lens device determines the user's tendency according to the one hundred data points on the focal length, the initial position for the first shot is set, for example, at the wide angle end. The mean value of the focal length data or the focal length at the maximum of the normal curve is designated as the initial focal length from the second shot to the ninety-ninth shot.

Furthermore, in this embodiment, a timer circuit may be provided in the control system as in the first embodiment. In this case, if the CPU 70 receives no signal for a predetermined time (thirty seconds for example), the timer circuit outputs a signal to the CPU 70. Receiving the signal from the timer circuit, the CPU 70 controls the variable motor 76 to move the lens barrel 78 to the initial position.

The second and third embodiments are separately explained. However, the variable focus lens device of one camera may have the functions in the second and third embodiments.

In this case, the memory 62 (see FIG. 3) and the memory 82 (see FIG. 4) are provided in the control system of the variable focus lens device. A changeover switch is provided to select the data stored in the memory 62 or 82.

If the memory 62 is selected via the changeover switch, the initial position is set at the focal length position corresponding to the standard angle of view. If the memory 82 is selected via the changeover switch, the initial position is set so as to correspond to the focal length which is frequently used by the user.

If a zoom lens device is employed as the variable focus lens device described in this embodiment, refocusing is unnecessary even if the magnification is varied. In the case of the variable focus lens device, focusing must be performed every time the magnification is varied.

As set forth hereinabove, according to the variable focus lens device of the camera of the present invention, the initial position of the variable focus lens is set substantially halfway between the wide angle end and the telephoto end of the variable focus lens. Thus, when there is an instantaneous change of the moving object, etc. immediately after the variable focus lens is positioned at the initial position when the power switch is turned on, the moving object can be quickly photographed in a desired visual field. The composition at the initial position differs less from the composition at the wide angle end or telephoto end than before. For this reason, the user is not confused by any composition during photographing.

In the variable focus lens device of the present invention, the focal length of the variable focus lens at the initial position corresponds to the standard angle of view. Thus, the object can be viewed via the camera in a size substantially equal to the object being viewed directly. Thereby, the user is not confused.

Furthermore, in the variable focus lens device of the present invention, the initial position of the lens barrel corresponds to the focal length which is frequently used by the user. Thereby, the object can be photographed at a desired focal length just after the power switch of the camera is turned on.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A variable focal length lens device in a camera, comprising:

a power switch for said camera;

a variable focal length lens provided in such a manner as to be movable in a range between a retracted position within a camera body and a telephoto end position of said variable focal length lens;

driving means for moving said variable focal length lens in said range;

control means for controlling said driving means to move said variable focal length lens when said power switch is turned on, so as to position said variable focal length lens at a predetermined initial position between a wide angle end of said variable focal length lens and said telephoto end; and timer means which measures elapsed time after each exposure, wherein said control means controls said driving means to move said variable focal length lens so as to return said variable focal length lens to said initial position if the elapsed time measured by said timer means exceeds a predetermined value.

2. A variable focus lens device in a camera, comprising:

a power switch for said camera;

a variable focus lens provided in such a manner as to be movable in a range between a collapsing position within a camera body and a telephotographing end position of said variable focus lens;

driving means for moving said variable focus lens in said range; and control means for controlling said driving means to move said variable focus lens when said power switch is turned on, so as to position said variable focus lens at an initial position substantially halfway between a wide end of said variable focus lens and said telephotographing end.

3. The variable focus lens device in the camera as defined in claim 2, further comprising timer means which measures elapsed time after each exposure, wherein said control means controls said driving means to move said variable focus lens so as to return said variable focus lens to said initial position if the elapsed time measured by said timer means exceeds a predetermined value.

4. A variable focus lens device in a camera, comprising:

a power switch for said camera;

a variable focus lens provided in such a manner as to be movable in a range between a collapsing position within a camera body and a telephotographing end position of said variable focus lens;

driving means for moving said variable focus lens in said range;

control means for controlling said driving means to move said variable focus lens when said power switch is turned on, so as to position said variable focus lens at an initial position corresponding to a standard angle of view.

5. The variable focus lens device in the camera as defined in claim 4, wherein said standard angle of view is approximately 46°.

6. The variable focus lens device in the camera as defined in claim 5, wherein said camera uses 35 mm film, and a focal length of said variable focus lens at said initial position is approximately 50 mm.

7. The variable focus lens device in the camera as defined in claim 5, wherein said camera uses film whose frame is 17 mm long and 30 mm wide, and a focal length of said variable focus lens at said initial position is approximately 40 mm.

8. The variable focus lens device in the camera as defined in claim 5, wherein said camera uses film whose frame is 60 mm long and 45 mm wide, and a focal length of said variable focus lens at said initial position is approximately 75 mm.

9. The variable focus lens device in the camera as defined in claim 4, further comprising timer means staring checking time on completion of photographing, and wherein said control means controls said driving means to move said variable focus lens so as to return said variable focus lens at said initial position if the time checked by the timer means exceeds a predetermined time.

10. A variable focal length lens device in a camera, comprising:

a power switch of said camera;

a variable focal length lens provided in such a manner as to be movable in a range between a retracted position within a camera body and a telephoto end position of said variable focal length lens;

driving means for moving said variable focal length lens in said range;

storing means for storing focal length data after every exposure;

determination means for determining a user's preferred focal length, according to said focal length data stored in said storing means, wherein the preferred focal length is determined based on a maximum value of a normal distribution curve representing the stored focal length data; and control means for controlling said driving means to move said variable focal length lens when said power switch is turned on, so as to position said variable focal length lens at an initial position according to the preferred focal length.

11. The variable focal length lens device in the camera as defined in claim 10, wherein said control means controls said driving means so that if the preferred focal length is determined to be in a half of a usable range of focal length closer to a wide angle end, said driving means moves said variable focal length lens to said wide angle end, and if the preferred focal length is determined to be in a half of the usable range of focal length closer to the telephoto end, said driving means moves said variable focal length lens to said telephoto end.

12. The variable focal length lens device in the camera as defined in claim 10, further comprising timer means staring checking time on completion of photographing, and wherein said control means controls said driving means to move said variable focal length lens so as to return said variable focal length lens at said initial position if the time checked by the timer means exceeds a predetermine time.

13. A variable focal length lens device in a camera, comprising:

a power switch for said camera;

a variable focal length lens provided in such a manner as to be movable in a range between a retracted position within a camera body and a telephoto end position of said variable focal length lens;

driving means for moving said variable focal length lens in said range;

control means for controlling said driving means to move said variable focal length lens when said power switch is turned on, so as to position said variable focal length lens at an initial position corresponding to a standard angle of view; and timer means which measures elapsed time after each exposure, wherein said control means controls said driving means to move said variable focal length lens so as to return said variable focal length lens to said initial position if the elapsed time measured by said timer means exceeds a predetermined value.

14. The variable focal length lens device in the camera as defined in claim 13, wherein said standard angle of view is approximately 46°.

15. The variable focal length lens device in the camera as defined in claim 14, wherein said camera uses 35 mm film, and a focal length of said variable focal length lens at said initial position is approximately 50 mm.

16. The variable focal length lens device in the camera as defined in claim 14, wherein said camera uses film whose frame is 17 mm long and 30 mm wide, and a focal length of said variable focal length lens at said initial position is approximately 40 mm.

17. The variable focal length lens device in the camera as defined in claim 14, wherein said camera uses film whose frame is 60 mm long and 45 mm wide, and a focal length of said variable focal length lens at said initial position is approximately 75 mm.

18. A variable focal length lens device in a camera, comprising:

a power switch of said camera;

a variable focal length lens provided in such a manner as to be movable in a range between a retracted position within a camera body and a telephoto end position of said variable focal length lens;

driving means for moving said variable focal length lens in said range;

storing means for storing focal length data after every exposure;

determination means for determining a user's preferred focal length, according to said focal length data stored in said storing means;

control means for controlling said driving means to move said variable focal length lens when said power switch is turned on, so as to position said variable focal length lens at an initial position according to the preferred focal length; and timer means for measuring time from completion of every exposure;

wherein said control means controls said driving means to move said variable focal length lens so as to return said variable focal length lens to said initial position if said time measured by said timer means exceeds a predetermined time.

19. The variable focal length lens device in the camera as defined in claim 18, wherein said control means controls said driving means so that if the preferred focal length is determined to be in a half of a usable range of focal length closer to a wide angle end, said driving means moves said variable focal length lens to said wide angle end, and if the preferred focal length is determined to be in a half of the usable range of focal length closer to the telephoto end, said driving means moves said variable focal length lens to said telephoto end.

\* \* \* \* \*